(Model.)
J. A. ROBINSON.
DENTAL PLATE.
No. 263,588. Patented Aug. 29, 1882.
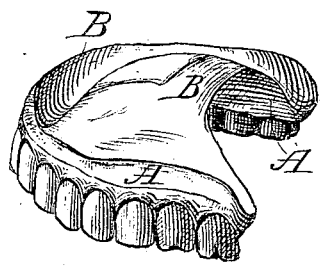
Witnesses:
Inventor:
Jeremiah A. Robinson, > # United States Patent Office.

JEREMIAH A. ROBINSON, OF JACKSON, MICHIGAN.

DENTAL PLATE.

SPECIFICATION forming part of Letters Patent No. 263,588, dated August 29, 1882.

Application filed September 12, 1881. (Model.)

*To all whom it may concern:*

Be it known that I, JEREMIAH A. ROBINSON, a citizen of the United States of America, residing in the city of Jackson, in the county of Jackson and State of Michigan, have invented certain new and useful Improvements in Dental Plates; and I do hereby declare the following to be a full, clear, and exact description of the invention, such as will enable others skilled in the art to which it appertains to make and use the same.

It is generally known by dentists that dental plates made of rubber or celluloid are with most people very injurious to the mouth, and in nearly all cases cause a rapid absorption of the alveolar process, while metallic plates produce no such injurious effect.

The object of my invention is to furnish a dental plate which will avoid the injury produced by rubber or celluloid plates, and at the same time furnish a much cheaper and better plate than those made entirely of metal.

To this end my invention relates to that class of plates which consist of a plastic material—such as vulcanized rubber, for instance—which have a facing or lining of gold-foil; and it consists in certain improvements, which will be hereinafter fully explained.

The annexed drawing represents a dental plate for the upper teeth.

A A represent the lower surface or main portion of the plate, made of rubber, celluloid, or other plastic material. B B represent the upper portion, or that part which comes in immediate and close contact with the gums and roof of the mouth, and which is overlaid or veneered with metal.

Having taken a cast of the mouth in the usual method well known to all dentists, I place upon the cast where I wish to have the plate overlaid or veneered a preparation of tin, known to dentists as "felt-foil." I moisten the same with camphorated spirits to the better soften the rubber or celluloid plate. I then put the plate into the mold or matrix in the usual manner, and subject it to the same degrees of heat and to the same pressure as are usually employed by dentists in vulcanizing and pressing the plates. The heat softens and the pressure forces the rubber or celluloid into all the interstices of the fibrous metal and consolidates with it, making a solid plate, thoroughly overlaid or veneered with metal, and as sharp and as perfect a fit as can be made with rubber or celluloid without the metal. The overlying metal or veneer may be made as thick as is desired, and may also be applied to both sides of the plate.

The metal I have used the most successfully for the metallic veneer is felt-foil, made from finely-shredded tin or fibers of tin, such as is used for filling teeth, and is sold by dealers in dental supplies. Shredded or cohesive gold may also be used, either alone or in combination with the felt-foil. The felt-foil is cheap, and is the most antiseptic of all metals, and produces no injurious effect to the mouth or stomach. The moistening of the metal with camphorated spirits is not necessary, and may be omitted, if desired.

I am aware that English Patent No. 1,549, A. D. 1860, describes a dental plate made from vulcanized rubber having applied thereto a facing of metal foil. Hence I do not claim such a plate; but my invention possesses material advantages over that described in said English patent in that, first, it is practically impossible to cause the plastic material to adhere to the smooth surface of the foil which is described in said English patent with sufficient tenacity to make such a plate of any utility, whereas by the use of felt-foil, which is fibrous and which has a surface composed of fine filaments of metal, I am enabled to effect a firm union between the plastic material and the metal portion of the plate, from the fact that by the combined use of heat and pressure the plastic material is caused to enter in between the filaments and to partially surround them and grasp them in such manner that a sufficient portion thereof is firmly embedded in the plastic material, while other portions of the filaments are firmly united to the embedded portions of the filaments in such manner that the entire metal facing is not only caused to adhere firmly to the plastic material, but is also condensed into a substantially impervious metal facing. Again, it is practically impossible to make the ordinarily smooth surfaced metal foil conform to the irregular surface of the mold in which the plate is formed without being wrinkled and folded in some parts and torn apart at other portions of the surface. Therefore a smooth impervious facing of metal cannot be formed upon a dental plate by the use of the ordinary smooth-surfaced foil; but by the use of felt-foil these difficulties are overcome, its structure being such that it will readily conform to the irregular surface of the mold without either fracture or wrinkles, substantially as would be done by any ordinary woven or felted fabric, while at the same time the plate, when completed, has a metal surface which is practically unbroken and impervious to the secretions of the mouth of the wearer.

What I claim as my invention, and wish to secure by Letters Patent, is—

1. As a new article of manufacture, a dental plate composed of a plastic material, as specified, in combination with a facing or surface formed of fine metal filaments and known as "felt-foil," substantially as set forth.

2. The herein-described improvement in the art of making dental plates, which consists of combining a sheet composed of metal filaments known as "felt-foil" with a layer of plastic material, and subsequently embedding or partially embedding the filaments in the plastic material, and condensing the metal filaments by the combined action of heat and pressure, thereby consolidating them with the plastic material, substantially as set forth.

In testimony whereof I have hereunto affixed my signature in the presence of two witnesses.

JEREMIAH A. ROBINSON.

Witnesses:
  JOSIAH B. FROST,
  MELVILLE MCGEE.